United States Patent [19]

Munakata

[11] Patent Number: 4,730,975

[45] Date of Patent: Mar. 15, 1988

[54] INDUSTRIAL ROBOT

[75] Inventor: Tadashi Munakata, Tokyo, Japan

[73] Assignee: Kabushiki Kaisha Toshiba, Kawasaki, Japan

[21] Appl. No.: 853,444

[22] Filed: Apr. 18, 1986

[30] Foreign Application Priority Data

Apr. 22, 1985 [JP] Japan .................................. 60-84407

[51] Int. Cl.$^4$ ............................................. B66C 18/00
[52] U.S. Cl. ................................ 414/735; 414/744 R; 901/15; 901/24
[58] Field of Search .................... 414/744 R, 729, 735; 901/15, 24

[56] References Cited

U.S. PATENT DOCUMENTS 4,540,332 9/1985 Nakashima et al. ............. 414/744 R
4,543,033 9/1985 Czermak et al. ..................... 414/732

FOREIGN PATENT DOCUMENTS

0092358 10/1983 European Pat. Off. .
2831361 2/1979 Fed. Rep. of Germany .
3211688 10/1983 Fed. Rep. of Germany .
2011572 7/1979 United Kingdom .
2053145 2/1981 United Kingdom .

Primary Examiner—Robert J. Spar
Assistant Examiner—Donald W. Underwood
Attorney, Agent, or Firm—Schwartz, Jeffery, Schwaab, Mack, Blumenthal & Evans

[57] ABSTRACT

In an industrial robot of a type having an arm made of a pentagonally connected links, of which an uppermost link is secured to a stationary member so as to be swingable around its axis, the uppermost link is rotated by a first motor, while second and third motors are provided nearby the uppermost link for operating upper links connected to the uppermost link swingably. A wrist base is pivotally connected to the lower ends of lower links to be swingable in a plane defined by the lower links and fourth and fifth motors are also provided nearby the uppermost link for driving, through belts and pulleys, a cross-shaped member pivotally connected to the wrist base and a wrist casing pivotally connected to the wrist base so as to swing around axes perpendicularly to each other.

6 Claims, 12 Drawing Figures

INDUSTRIAL ROBOT

BACKGROUND OF THE INVENTION

This invention relates to an industrial robot, and more particularly to a type thereof adapted to be used for assembling various parts.

Figure 1:
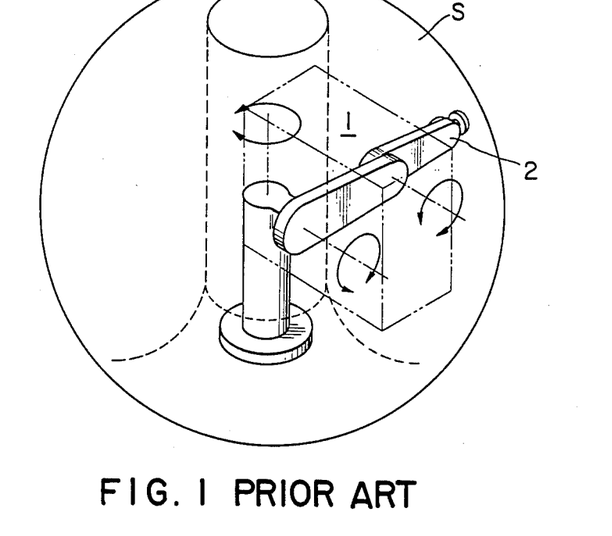
FIG. 1 is a diagram showing an operational range of a conventional robot.

Industrial robots of cartesian coordinate type, cylindrical coordinate type, and of an articulated type swingable around a plurality of perpendicularly disposed axes have been widely known. Among these types of robots, the articulated robot swingable around a plurality of axes as shown in FIG. 1 is advantageous for assembling parts because of its wide operation range. However, in the situation where a workpiece, with which various parts are to be assembled, is conveyed to an assembling position of the robot by a conveyor and devices for supplying the parts are arranged around the assembling position, only a small part as indicated by two dot dash line in FIG. 1 is utilized within the entire spherical operating range because of the necessity of reducing working time and economizing conveying distance for assembling the robot.

Furthermore, since the workpiece conveyed by the conveyor and the supplying devices for supplying parts cannot be arranged underneath the robot, the number of the parts assembled by the robot is restricted. In addition, because of the posture of the wrist of the robot, assembling operations thereof from a side remote from the base of the robot has been found to be difficult.

Figure 2:
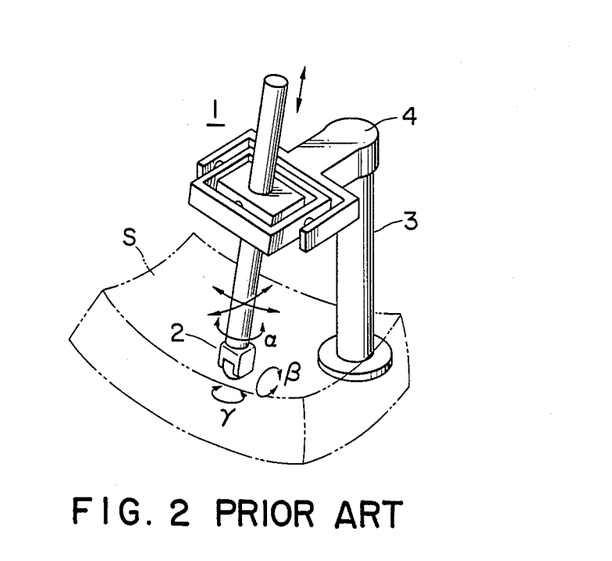
FIG. 2 is a diagram showing another type of conventional robot.

For obviating these difficulties, a polar-coordinate robot of a suspending type as shown in FIG. 2 has been proposed in the 14th International Symposium on Industrial Robots held in 1984. in this type of robot, the workpiece to be assembled with various parts is placed below the arm 1 of the robot, and the devices for supplying the parts can be arranged around the workpiece. Thus the operation range S shown in FIG. 2 can be utilized efficiently and the workpiece can be accessed from all the directions around the workpiece.

Figure 3:
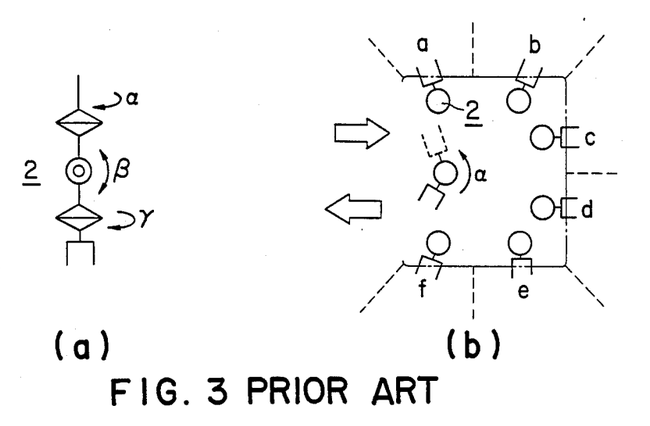
FIGS. 3(a) and 3(b) are diagrams showing the operation of the conventional robot shown in FIG. 2.

However, since the arm 1 of this type robot is moved upwardly and downwardly, an excessive space is required above the robot. Furthermore, the wrist 2 of the robot is brought into a desired position by rotating the arm 1 for an angle $\alpha$, rotating a member supporting the wrist 2 for an angle $\beta$ around an axis perpendicular to the rotation of the arm 1 and then rotating the wrist 2 for an angle $\gamma$ around an axis perpendicular to the rotation of the member as shown in FIG. 3(a). Thus, after the parts a, b, c, ..., f have been transported from the parts supplying devices and assembled onto the workpiece as shown in FIG. 3(b), the arm must be rotated in the reverse direction around its axis for avoiding the rotation of the arm in excess of the limiting angle. Thus, the posture variation of the wrist in the case of assembling the parts cannot be executed at a minimum value of the rotating angle $\alpha$, and the time required for assembling the parts is increased. In addition, for the purpose of improving the operating speed of the robot, the unbalanced condition in the mass of the arm 1 must be reduced as well as the reduction of the moment of inertia of the arm 1.

SUMMARY OF THE INVENTION

An object of this invention is to provide an industrial robot in which the aforementioned difficulties of the conventional robots can be substantially eliminated.

Another object of this invention is to provide an industrial robot whose operational range is utilized effectively, whose size and weight as well as its unbalanced condition are reduced, and whose operational speed is substantially increased.

These and other objects of the invention can be achieved by an industrial robot of a type having an arm made of pentagonally connected links, an uppermost link thereof extending horizontally being secured to a stationary member to be rotatable around the axis of the link, the robot comprising: a first motor provided between the stationary member and the uppermost link for rotating the uppermost link around its axis; second and third motors provided at both ends of the uppermost link for operating upper links of the pentagonally connected links in a swingable manner, the upper links being downwardly connected with lower links of the pentagonally connected links, respectively, and the lower ends of the lower links being connected with each other in a pivotal manner; and a wrist assembly pivotally connected to the lower ends of the lower links so as to be swingable in a plane defined by the lower links.

The wrist assembly comprises a wrist base member which is preferably provided with a first crevice portion extending upwardly and a second crevice portion extending downwardly. A connecting bar is connected between the first crevice portion and a pivotal point provided on one of the upper links in a manner extending in parallel with a lower link connected to the upper link. A hollow cross-shaped member having a pair of side surfaces is connected with the second crevice portion in a swingable manner. A wrist casing encasing a motor which rotates a flange provided at an end of the output shaft may be swingably connected to another pair of side surfaces of the hollow cross-shaped member. Fourth and fifth motors are also provided at both ends of the uppermost link, and power transmission means may also be provided between the fourth and fifth motors and the cross-shaped member and the wrist casing for swinging the cross-shaped member and the wrist casing, respectively. Alternatively, the first, second and third motors may be low-speed, high-torque type motors.

DESCRIPTION OF THE PREFERRED EMBODIMENT

A preferred embodiment of this invention will now be described in detail with reference to FIGS. 4 to 8. The embodiment comprises a vertically disposed columnar member 3, and a supporting member 4 which extends horizontally from an upper end of the columnar member 3. The supporting member 4 has, at a forward end thereof, a cylindrical portion 4a which extends horizontally at right angles to the extending direction of the supporting member 4. A shaft 4b is provided to extend along the axis of the cylindrical portion 4a and is supported rotatably by the cylindrical portion 4a. A pair of T-shaped brackets 5A and 5B having upwardly projecting lever-like portions 5a and 5b, respectively, are fixedly mounted on the lateral ends of the shaft 4b.

Figure 4:
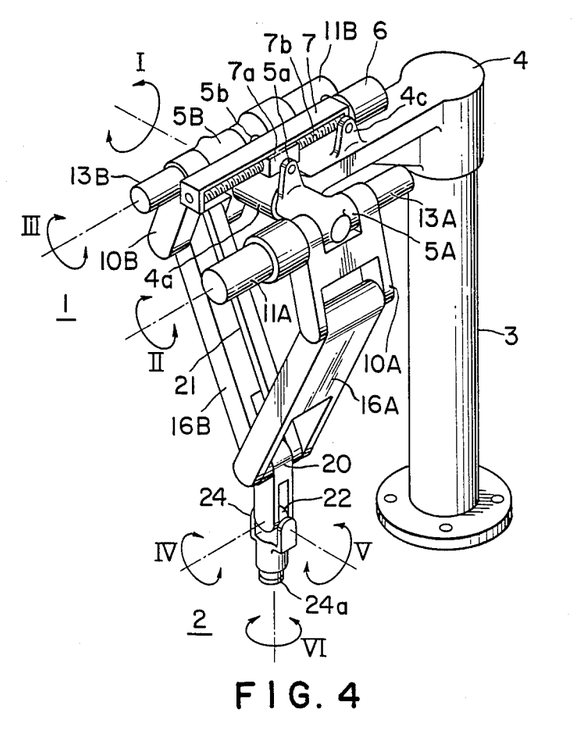
FIG. 4 is a perspective view showing a preferred embodiment of this invention.

A crevice portion 4c provided upwardly of the supporting member 4 swingably supports a ball screw unit 7 which includes a screw-threaded shaft 7b driven by a motor 6 and a nut member 7a shifted along the screwthreaded shaft 7b. The nut member 7a is pivotally coupled with the lever-like projections 5a and 5b of the T-shaped brackets 5A and 5B.

A shaft 9A extending forwardly and rearwardly through the T-shaped bracket 5A is secured to the T-shaped bracket 5A. An upper end of an upper link 10A is swingably supported by a portion of the shaft 9A projecting outwardly from the T-shaped bracket 5A. A motor 11A is mounted on the forward surface of the upper link 10A at a position aligning with the shaft 9A. A wave generator 12a is coupled with the driving shaft of the motor 11A. A circular spline 12b secured to the upper link 10A and a flexible spline 12c secured to an end of the shaft 9A comprise a harmonic speed-reduction mechanism 12A.

On the rearward surface of an upper end of the upper link 10A, another motor 13A is mounted at a position aligning with the shaft 9A, and a pulley 15A is secured to the driving shaft of the motor 13A. A toothed endless belt 14A which extends around the pulley 15A has a lower end engaging with one of a pair of toothed pulleys 17A, which are coupled together by a pin (not numbered). Through this pin, the lower end of the upper link 10A is swingably coupled with the upper end of a lower link 16A.

Symmetrical with the above described construction, a shaft 9B is extended forwardly and rearwardly through the other T-shaped bracket 5B, so as to be secured to the bracket 5B. Upper end of another upper link 10B is swingably supported by a portion of the shaft 9B projecting outwardly from the bracket 5B. Motors 11B and 13B are provided on the rearward and forward surfaces of the upper link 10B for driving a wave generator 12b and a pulley 15B, respectively. A circular spline 12b and a flexible spline 12c are also provided so as to form a harmonic speed reduction mechanism 12B. A toothed endless belt 14B is also provided to extend around the pulley 15B and one of a pair of toothed pulleys 17B integrally coupled together through a pin (not numbered). The lower end of the upper link 10B is swingably coupled with the upper end of a lower link 16B through this pin. The lower ends of the lower links 16A and 16B are swingably coupled with a wrist base 20 through pins which are coupling pulley pairs 22A and 22B respectively as described hereinafter in detail. The brackets 5A, 5B, upper links 14A, 14B, and lower links 16A, 16B are connected together into an assembly having a pentagonal configuration.

A toothed endless belt 16a is extending around the other one of the pulleys 17A and one of the pulleys 22A coupled together by a pin pivotally connecting the lower link 16A with the wrist base 20. Likewise, a toothed endless belt 16b is extended around the other one of the pulleys 17B and one of the pulleys 22B which is coupled together by a pin pivotally connecting the lower link 16B with the wrist base 20.

Figure 5:
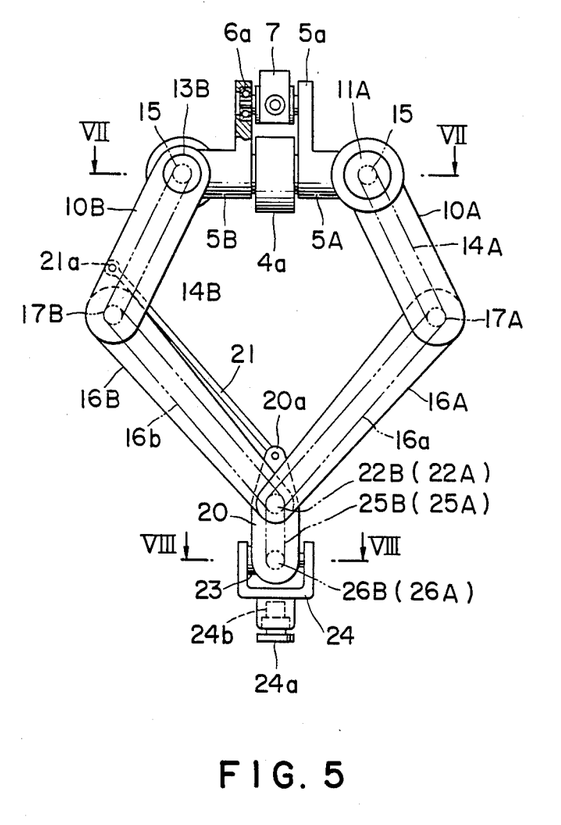
FIG. 5 is a front view of a link connection supporting a wrist of the embodiment shown in FIG. 4.
Figure 6:
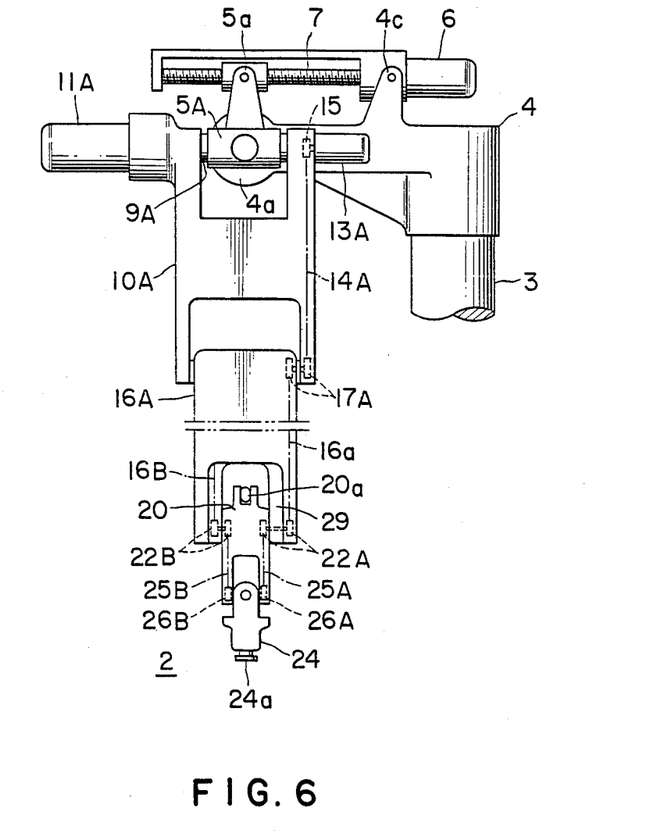
FIG. 6 is a side view of the link connection and the wrist of the embodiment.
Figure 7:
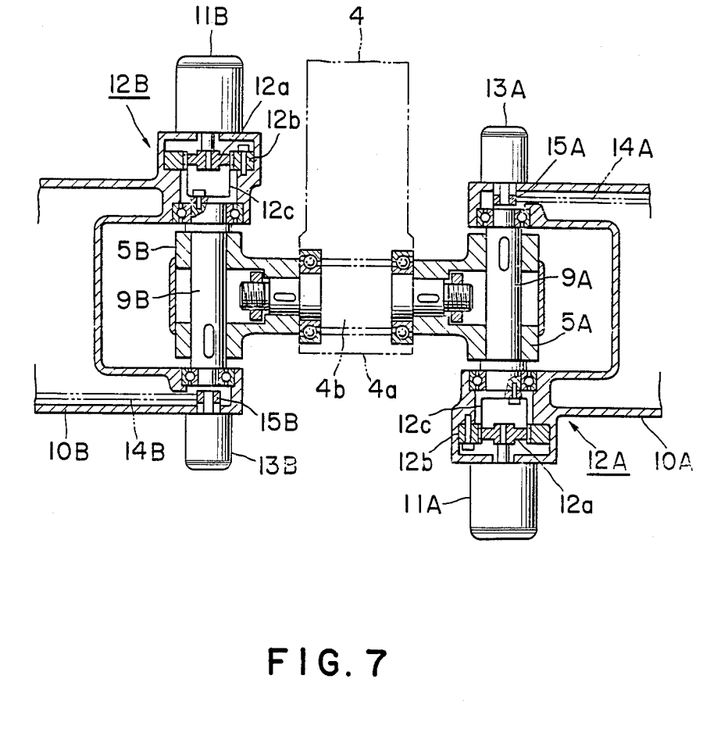
FIG. 7 is a sectional view taken along the line VII—VII in FIG. 5.
Figure 8:
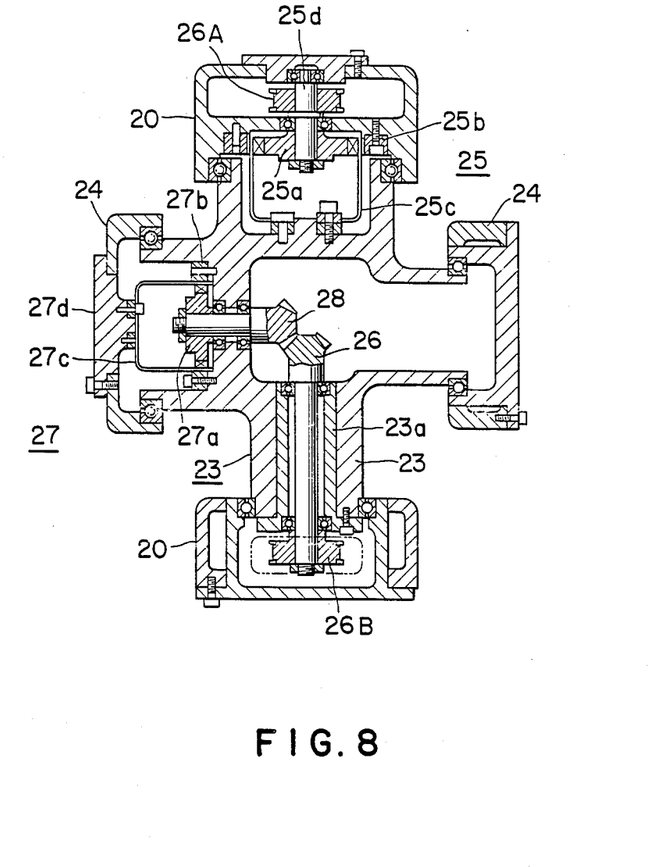
FIG. 8 is a sectional view taken along the line VIII—VIII in FIG. 5.

As shown in FIGS. 5 and 6, an upper end of a connecting bar 21 is swingably connected to the upper link 10B by a pivot pin 21a, while the lower end of the connecting bar 21 is swingably connected to a crevice 20a provided at the upper end of the wrist base 20. The lower end of the wrist base 20 is bifurcated into two legs which swingably support a cross-shaped member 23 on the front and rear sides thereof as shown in FIG. 8. Also, bifurcated upper ends of a wrist casing 24 housing a motor 24b are swingably connected to the lateral sides of the cross-shaped member 23. The driving shaft of the motor 24b is coupled through a speed reduction mechanism (not shown) to a flange 24a. A toothed endless belt 25A is extended around the other one of the pulleys 22A and a toothed pulley 26A which is coupled by a shaft 25d with a wave generator 25a. The wave generator 25a together with a flexible spline 25c fixed to the rear end of the cross-shaped member 23 and a circular spline 25b fixed to the lower end of the wrist base 20 comprise a harmonic speed reduction mechanism 25. Likewise, a toothed endless belt 25B is extended around the other one of the pulleys 22B and a toothed pulley 26B fixed to the shaft portion of a bevel gear 26 which is rotatably supported by the cross-shaped member 23 through a sleeve member 23a. The bevel gear 26 meshes, in a central portion of the cross-shaped member 23, with another bevel gear 28 which is supported rotatably by the member 23 and is coupled at the other end thereof with a wave generator 27a. Together with a flexible spline 27c which is fixed to the wrist casing 24 through an attached member 27d and a circular spline 27b which is secured to an internal surface of the cross-shaped member 23, the wave generator 27a comprises a harmonic speed reduction mechanism 27.

The operation of the arm of the robot will now be described.

When the motor 6 is energized, the brackets 5A and 5B are swung around the central axis of the shaft 4b by means of the ball screw unit 7 and the arm made of pentagonally connected T-shaped brackets 5A, 5B, upper links 10A, 10B, and lower links 16A, 16B is thereby swung around the same shaft 4b in the arrowed direction I in FIG. 4.

When the motors 11A and 11B are operated, their rotations are reduced by the harmonic speed reduction mechanisms 12A and 12B and the upper links 10A and 10B are independently rotated in the arrowed directions II and III in FIG. 4, respectively. Thus the wrist 2 of the robot is moved in an operating range S indicated by a shaded area in FIG. 9. More specifically, when the upper link 10A is rotated in the counter-clockwise direction to a limiting point A and the upper link 10B is then rotated in the counter-clockwise direction from a limiting point B to another limiting point B', the wrist 2 connected to the lower ends of the lower links 16A, 16B is moved from a point C to a point C', thus following the locus of an upper arc of the operating range S.

Figure 9:
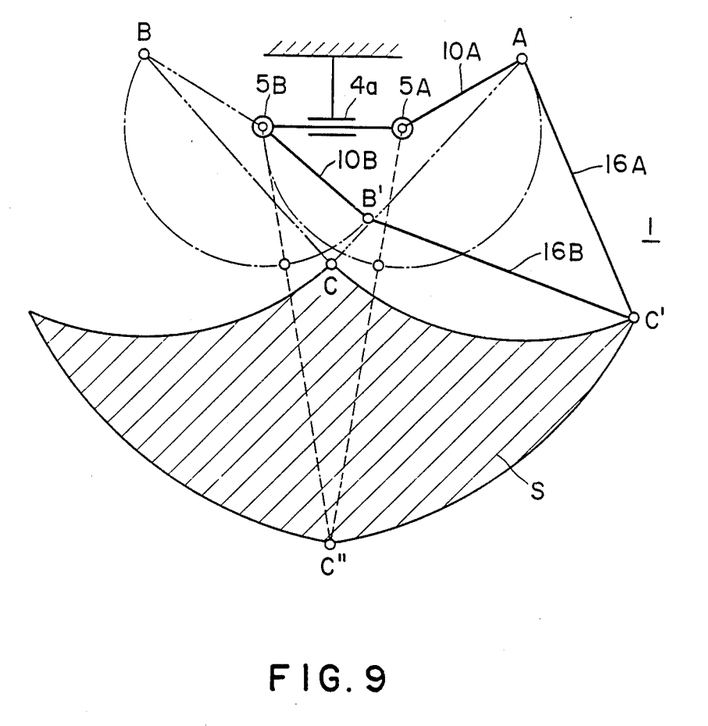
FIG. 9 is a diagram used for explaining the operation of the embodiment shown in FIGS. 4 through 8.

Furthermore, when the upper links 10A, 10B are rotated simultaneously inwardly in opposite directions at an equal rotating speed, the wrist 2 connected to the lower ends of the lower links 16A and 16B is moved in a linear manner from the initial point C to a point C".

During these operations, since the wrist base 20 is connected to the lower ends of the lower links 16A and 16B is further connected through the connecting bar 21 to the upper link 10B as described before, the wrist base 20 is always held in a predetermined relation with the upper link 10B.

When the motor 13A is operated, the driving force of the motor 13A is transmitted through the toothed belts 14A, 16a and 25A to the pulley 26A as best illustrated in FIG. 6. The rotation of the pulley 26A rotates the cross-shaped member 23 relative to the wrist base 20 in the directions marked with arrows IV in FIG. 1 at a speed reduced by the harmonic speed-reduction mechanism 25. Likewise, when the motor 13B is operated, the driving force of the motor 13B is transmitted through the belts 14B, 16b, and 25B to the bevel gears 26 and 28. The rotation of the bevel gear 28 rotates the wrist casing 24 relative to the cross-shaped member 23 in a direction marked with arrow V in FIG. 1 at a speed reduced by the harmonic speed-reduction mechanism 27.

When the motor 24b is also provided with a speed-reduction mechanism is operated, the flange 24a is rotated relative to the wrist casing 24 in an arrow marked direction VI shown in FIG. 1.

In the above described construction of the arm of the robot, the motors 6, 11A, 11B, 13A and 13B are all arranged at positions aligning with or near the axes of the rotations I, II, III corresponding to three degrees of freedom of the arm 1. Thus the moments of inertia around the rotating axes are reduced and the load torques required for the motors are equalized. Since similar motors and speed-reduction mechanisms are used for the rotations around the axes II, III, IV and V, imbalance in weight of the motors and the like can be reduced. Furthermore, the operating range of the robot is restricted to a parallelepiped space, and therefore the capacities of the motors can be reduced. Since the power transmissions for the rotations IV and V of the wrist 2 are realized at a high speed by the toothed belts passing through the upper links 10A, 10B and the lower links 16A, 16B, the size and weight of the robot can be reduced. In addition, since the wrist 2 is made of the wrist base 20, cross-shaped member 23 and the wrist casing 24, which are all connected into a Cardan joint-like construction rendering three degrees of freedom around the axes IV, V and VI, the operational direction of the wrist can be infinitely varied at any time. The reversing operation around the axis α required for the conventional robot can be thereby obviated, and the work assembling operation of the robot can thereby be done at a high speed. Furthermore, the vertical movement of the arm 1 is produced by the articulate movements of the upper links 10A, 10B and the lower links 16A, 16B, so that the useless space which typically exists in the conventional robot operation range can be substantially reduced.

Figure 10:
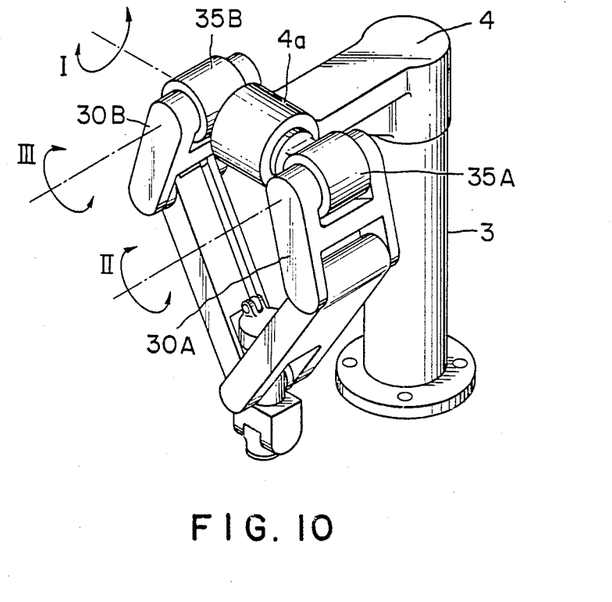
FIG. 10 is a perspective view showing another embodiment of the invention.
Figure 11:
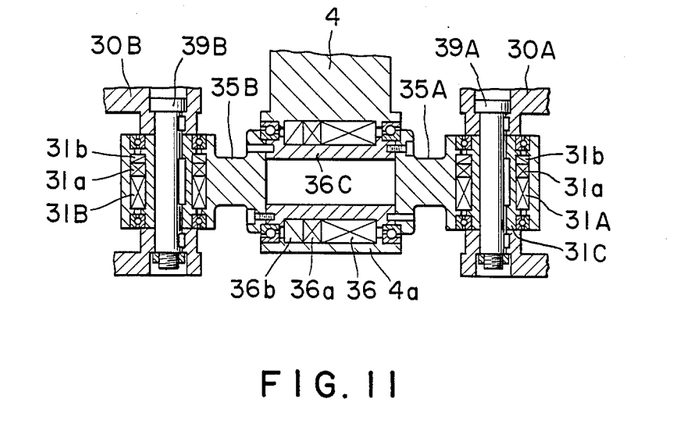
FIG. 11 is cross-sectional view sectioned along a plane including the rotating axes II and III in FIG. 10.

Although in the above described embodiment, the rotations around the axes I, II, and III in FIG. 4 are carried out by use of a combination of the motor 6 and the ball screw unit 7, and combinations of the motors 11A, 11B and the harmonic speed-reduction mechanisms 12A, 12B, the rotations may otherwise be accomplished by use of low-speed, high-torque electric motors 36, 31A and 31B as shown in FIGS. 10 and 11.

In the embodiment shown in FIGS. 10 and 11, instead of the combination of the motor 6 and the ball screw unit 7 of the previously described embodiment, a low-speed, high-torque electric motor 36 is provided within the cylindrical portion 4a of the supporting member 4. More specifically, the stator of the electric motor 36 is provided in an integral manner within the cylindrical portion 4a such that it is coaxial with a rotation detector 36a and a brake 36b which are also contained in the portion 4a, and an output shaft 36c combined with the rotor of the electric motor 36 is rotatably supported by the cylindrical portion 4a through bearings (not numbered). Brackets 35A and 35B are secured to the lateral (or rightward and leftward) ends of the output shaft 36c of the electric motor 36 by means of studs and pins (not numbered). In the bracket 35A, there is provided another low-speed, high-torque electric motor 31A, the stator of which is arranged coaxially with a rotation detector 31a and a brake 31b. A hollow output shaft 31c of the electric motor 31A, which is integrally combined with the rotor of the electric motor 31A and extending forwardly and rearwardly through the bracket 35A, is rotatably supported through bearing (not numbered) by the brackets 35A. A shaft 39A is extended through the hollow output shaft 31c, and secured thereto by means of a key (not numbered). An upper link 30A which corresponds to the upper link 10A of the previous embodiment is secured to the shaft 39A at a position thereof projecting outwardly from the hollow output shaft 31c.

In the other bracket 35B is also provided still another low-speed, high-torque electric motor 31B, the stator of which is arranged coaxially with a rotation detector 31a and a brake 31b, and another shaft 39B secured to the output shaft of the electric motor 31B is coupled with another upper link 30B corresponding to the upper link 10B of the previously described embodiment. Otherwise, the construction of the embodiment shown in FIGS. 10 and 11 is similar to those of the previously described embodiment shown in FIGS. 4-8.

In the previously described embodiment of the invention shown in FIGS. 4-8, although the rotation around the axis VI of the wrist 2 is carried out by a motor 24b provided within the wrist casing 24, it will be understood by one skilled in the art that such a rotation around the axis VI may be produced by another high-speed transmission system provided through the upper links and lower link as for the rotations around the axes IV and V of the wrist 2.

The connecting bar 21 interconnecting the wrist base 20 with the upper link 10B may also be replaced by a combination of a pantagraph-like mechanism and a sliding mechanism which interconnect the wrist base 20 with the lower links 16A and 16B swingably, so that the wrist base 20 is held in a direction bisecting the angle formed between the lower links 16A and 16B. Alternatively, the harmonic speed reduction mechanism used for the rotations of II, III, . . . , VI may be replaced by a planetary-gear mechanism and the like.

According to the invention, the arm of the robot is made of a plurality of links pivotally connected into a pentagonal configuration, an uppermost link thereof formed by T-shaped brackets being supported by a stationary member so that the entire arm is swingable around the central axis of the uppermost link. Upper links among the pentagonally connected links are connected to the both ends of the uppermost link to be swingable independently, and the wrist of the robot is connected to an end of the arm such that the wrist is independently swingable around three axes for imparting three degrees of freedom of the movement. Furthermore, since the motors for driving the arm and the wrist around at least two axes thereof are provided collectively at both ends of the uppermost link, a robot of a small size and light weight is provided which is capable of utilizing the operation range effectively, of carrying out complex assembling operation at a high speed and in a highly balanced condition, which occupies only a relatively small space for its operation, and which has a wrist whose the posture can be infinitely varied in the operating plane.

What is claimed is:

1. An industrial robot of a type having an arm made of pentagonally connected links, an uppermost link thereof extending horizontally and having a horizontal axis and being secured to a stationary member to be rotatable around the horizontal axis, said robot comprising:
    a first motor provided between said stationary member and said uppermost link for rotating said uppermost link around its axis;
    second and third motors provided at opposite ends, respectively, of said uppermost link for operating upper links of said pentagonally connected links in a swingable manner, said upper links being downwardly connected with lower links of the pentagonally connected links, respectively, and the lower ends of the lower links being connected with each other in a pivotal manner; and
    a wrist assembly pivotally connected to the lower ends of the lower links so as to be swingable in a plane defined by said lower links.

2. An industrial robot according to claim 1 wherein said wrist assembly comprises a wrist base member having a first crevice portion extending upwardly and a second crevice portion extending downwardly, a hollow cross-shaped member having a pair of side surfaces connected with said second crevice portion of said wrist base member to be swingable around said second crevice portion, a wrist casing swingably connected to another pair of side surfaces of said hollow cross-shaped member, and encasing therein a motor which rotates a flange provided at an end of the output shaft of said motor, and said robot further comprising a connecting bar connected between said first crevice portion and a pivotal point provided on one of said upper links so as to be extended in parallel with one of said lower links which is connected with one of said upper links, fourth and fifth motors also provided at opposite ends, respectively, of said uppermost link, and power transmission means provided between said fourth and fifth motors and said cross-shaped member and said wrist casing for swinging the cross-shaped member and said wrist casing, respectively.

3. An industrial robot according to claim 1 wherein said first, second and third motors are of a low-speed high-torque type self-contained in said respective positions.

4. An industrial robot according to claim 1 wherein said uppermost link comprises a pair of T-shaped brackets which are secured to opposite ends of a shaft extending along the axis and rotatably supported by said stationary member and said first motor is operatively coupled to said brackets through a screw-thread shaft-and-nut combination.

5. An industrial robot according to claim 4 wherein a forwardly and an aftwardly extending shaft are positioned substantially perpendicular to the axis and are respectively secured to each of said two brackets and said second and third motors are mounted on the same respective end of said forwardly and aftwardly extending shafts, respectively.

6. An industrial robot according to claim 5 wherein fourth and fifth motors for swinging said wrist assembly about perpendicular axes are mounted on the other respective ends of said forwardly and aftwardly extending shafts, respectively.

* * * * *